United States Patent
Oga et al.

(10) Patent No.: US 8,562,017 B2
(45) Date of Patent: Oct. 22, 2013

(54) VEHICLE SEAT INCLUDING SIDE AIRBAG SYSTEM

(75) Inventors: Takashi Oga, Toyota (JP); Takeshi Kamiya, Chiryu (JP)

(73) Assignee: Toyota Boshoku Kabushiki Kaisha, Aich-Ken (JP)

( * ) Notice: Subject to any disclaimer, the term of this patent is extended or adjusted under 35 U.S.C. 154(b) by 0 days.

(21) Appl. No.: 13/413,956

(22) Filed: Mar. 7, 2012

(65) Prior Publication Data

US 2012/0228907 A1    Sep. 13, 2012

(30) Foreign Application Priority Data

Mar. 8, 2011 (JP) ................... 2011-049889

(51) Int. Cl.
*B60R 21/207* (2006.01)

(52) U.S. Cl.
USPC ................. 280/730.2; 297/216.13; 297/216.1

(58) Field of Classification Search
USPC ......................... 280/730.2; 297/216.13, 216.1
See application file for complete search history.

(56) References Cited

U.S. PATENT DOCUMENTS

| 2010/0295282 A1* | 11/2010 | Kim et al. | 280/730.2 |
| 2011/0012330 A1* | 1/2011 | Sato et al. | 280/730.2 |
| 2011/0074136 A1* | 3/2011 | Honda et al. | 280/728.3 |
| 2011/0140396 A1* | 6/2011 | Urabe et al. | 280/728.2 |

FOREIGN PATENT DOCUMENTS

JP    2007-176349    7/2007

* cited by examiner

*Primary Examiner* — Ruth Ilan
(74) *Attorney, Agent, or Firm* — Greenblum & Bernstein, P.L.C.

(57) ABSTRACT

A vehicle seat including a side airbag system, in which an airbag body accommodated inside a seatback of the vehicle seat is configured to deploy when the vehicle is collided from a side thereof and a deployment groove which is configured to improve the deployment of the airbag body is formed to a cushion pad of the seatback, wherein a guide portion which is configured to guide the deployment of the airbag body towards a desired height is formed to the deployment groove.

3 Claims, 9 Drawing Sheets

PRIOR ART

PRIOR ART

PRIOR ART

VEHICLE SEAT INCLUDING SIDE AIRBAG SYSTEM

CROSS-REFERENCE TO RELATED APPLICATIONS

This application claims priority from Japanese Patent Application No. 2011-049889 filed on Mar. 8, 2011, the entire contents of which are incorporated herein by reference.

TECHNICAL FIELD

Aspects of the present invention relate to a vehicle seat with a side airbag system and more particularly to a vehicle seat with a side airbag system in which an airbag body accommodated inside a seatback of the vehicle deploys when the vehicle receives an impact from a side thereof as a result of a side collision and a deployment groove is formed inside the seatback to improve the deployment of the airbag body.

BACKGROUND

There is known a vehicle seat 201 with a side airbag system 240. In the side airbag system 240, as shown in FIGS. 7, 9, when a vehicle is collided from a side thereof, an airbag body 242 accommodated inside a seatback 203 of the collided vehicle is inflated by a gas injected from an inflator (not shown). The inflated airbag presses and opens a back pad 220 (not shown in FIGS. 7 and 9). When the airbag body 242 is inflated further with the back pad 220 being pressed and opened, the airbag member 242 deploys to an outside of the seat back 203 along a trim (not shown) provided to an inside of a side door while tearing a seat skin 203 which covers a surface of the back pad 220. Here, JP-A-2007-176349 discloses a vehicle seat 201 with a side airbag system 240 in which a deployment slit 222 is formed to a back pad 220 of a seatback 203 as shown in FIG. 8. According to the configuration disclosed in JP-A-2007-176349, an airbag body 242 can deploy reliably.

SUMMARY

However, in the disclosure of JP-A-2007-176349, the deployment slit 222 is formed so that its depth becomes uniform in a height direction of the back pad 220 of the seatback 203. This causes a problem that it is difficult to deploy the airbag body 242 to a target deployment position (a deployment position indicated by imaginary lines in FIG. 9) in the height direction of the seatback 203.

Aspects of the invention has been made with a view to solving the problem, and an object thereof is to provide a vehicle seat with a side airbag system which enables an airbag body to deploy to a target deployment position in a height direction of a seatback.

According to a first aspect of the invention, there is provided a vehicle seat including a side airbag system, in which an airbag body accommodated inside a seatback of the vehicle seat is configured to deploy when the vehicle is collided from a side thereof and a deployment groove which is configured to improve the deployment of the airbag body is formed to a cushion pad of the seatback, wherein a guide portion which is configured to guide the deployment of the airbag body towards a desired height is formed to the deployment groove.

According to this configuration, the airbag body can deploy so as to pass by a protection reference point within 10 milliseconds. Namely, the airbag body can reliably deploy to a target deployment position in a height direction of the seatback.

The guide portion may be formed by increasing a depth of the deployment groove partially in a height direction of the guide portion.

According to this configuration, the guide portion can easily be formed.

The guide portion may be formed by increasing a width of the deployment groove partially in a height direction of the guide portion.

According to this configuration, the guide portion can easily be formed.

According to a second aspect of the invention, there is provided a vehicle seat including a side airbag system, the vehicle seat comprising; a seatback including a cushion pad; an airbag body which is accommodated inside the seatback and is configured to deploy when the vehicle is collided from a side thereof; a deployment groove which is formed to the cushion pad and is configured to improve the deployment of the airbag body; and a guide portion which is formed to the deployment groove and is configured to guide the deployment of the airbag body towards a desired height.

DETAILED DESCRIPTION

Figure 1:
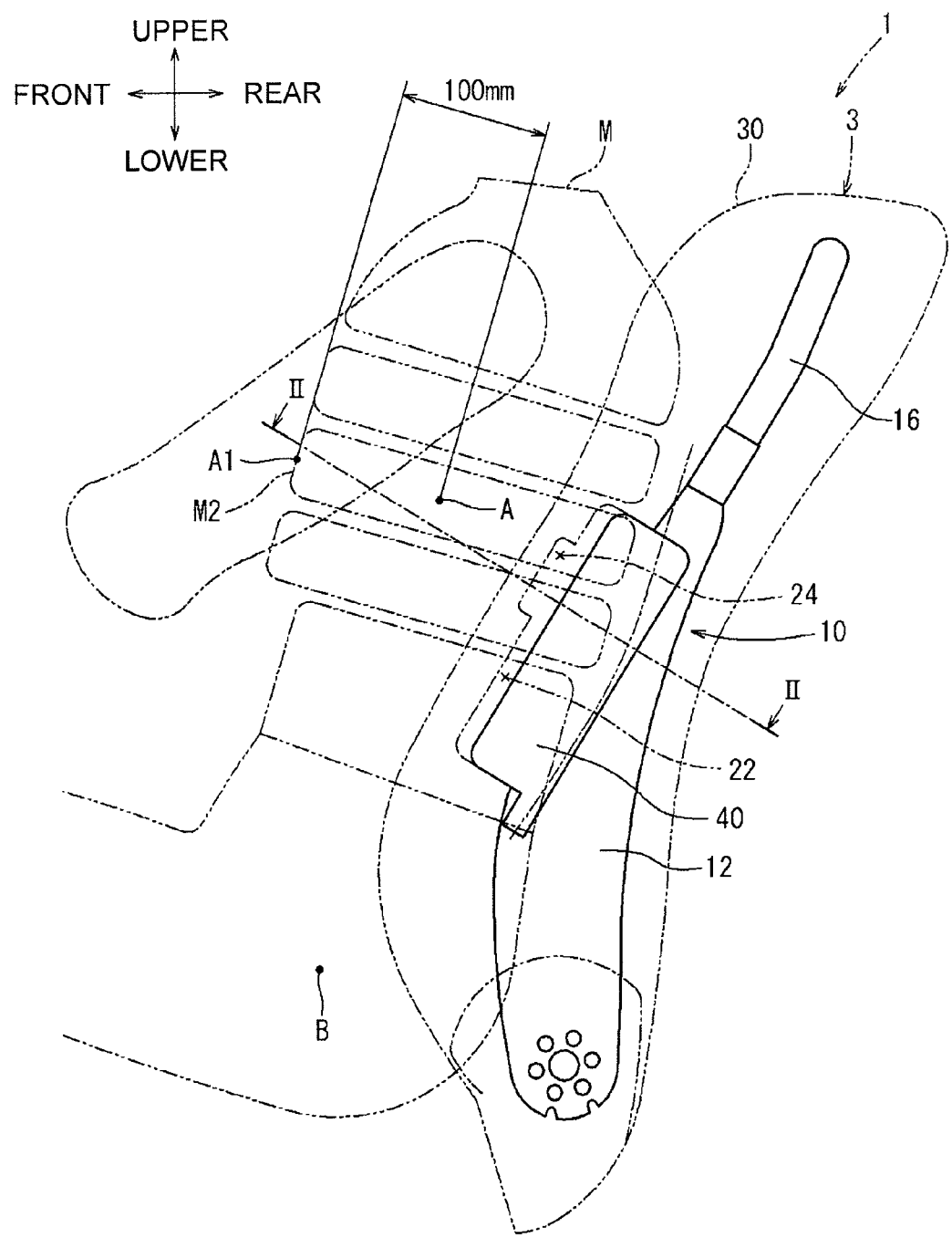
FIG. 1 is a side view of an inside of a front passenger seat according to a first exemplary embodiment of the invention.

Hereinafter, exemplary embodiments of the invention will be described with reference to the drawings.

First Exemplary Embodiment

Firstly, a first exemplary embodiment of the invention will be described with reference to FIGS. 1 to 3. In the following description, a "front passenger seat 1" will be taken as an example of a "vehicle seat including a side airbag system." Additionally, when referred to in the following description, upper, lower, front, rear, left and right mean directions indicated as upper, lower, front, rear, left and right in the accompanying drawings, that is, upper, lower, front, rear, left and right directions based on the front passenger seat 1. This will also be the same in a second exemplary embodiment that will be described later.

Firstly, referring to FIGS. 1 and 2, a schematic configuration of a front passenger seat 1 according to the first exemplary embodiment of the invention will be described. The front passenger seat 1 includes mainly a seat cushion (not shown) and a seatback 3.

Here, the seatback 3 will be described. The seatback 3 includes a back frame 10, a back pad 20 and a skin 30. The back frame 10 includes a left side frame 12, a right side frame (not shown), an upper frame 16 and a lower rod (not shown) and is formed in a substantially rectangular frame. The back pad 20 is assembled to the back frame 10 so as to encompass the back frame 10. The skin 30 covers a surface of the back pad 20. Meanwhile, since a well-known seat cushion may be used as the seat cushion (not shown) of the front passenger seat 1, a detailed description thereof will be omitted here.

An airbag module 40 is assembled to an outer side of the left side frame 12. This airbag module 40 corresponds to a side airbag system described in appended claims. An airbag body 42 (not shown in FIGS. 1 and 2) is accommodated in this airbag module 40 in a folded state. This airbag body 42 is connected to an inflator (not shown) which is provided inside the seatback 3 via a hose (not shown). This inflator (not shown) is electrically connected to an ECU (not shown) which is provided inside a vehicle to which the front passenger seat 1 is installed.

Meanwhile, among inner surfaces of the back pad 20, a deployment groove 22 is formed to an inner surface of the back pad 20 which faces a portion of the airbag module 40 where the airbag body 42 deploys (a front portion of the airbag module 40) so as to extend along a height direction thereof. By forming the deployment groove in this way, when the airbag body 42 deploys, the airbag body 42 can deploy along a trim (not shown) provided to an inside of a side door of the vehicle.

A layer of a protection material 26 which is impregnated with a nonwoven fabric is formed on each of the inner surfaces of the back pad 20. According to this configuration, the shape of the back pad 20 can be maintained. Additionally, the inner surfaces of the back pad 20 can be protected.

A first guide portion 24 which is configured to guide the deployment of the airbag body 42 towards a desired height is formed to the deployment groove 22. The desired height means a height of a protection reference point of a dummy mannequin M, for example. In a case where a chest of the dummy mannequin M is a target to be protected, as shown in FIG. 1, the protection reference point becomes a point A which is 100 mm rearwards from a front end A1 of a rib M2 of the chest of the dummy mannequin M.

The first guide portion 24 is formed by increasing a depth of the deployment groove 22 partially in the height direction so that when the airbag body 42 deploys, the airbag body 42 can pass by the point A within 10 milliseconds. The seatback 3 is configured in this way. The front passenger seat 1 is configured of a well-known seat cushion (not shown) and the above-described seatback 3.

Next, referring to FIG. 3, the function of the front passenger seat 1 will be described. When the side door of the vehicle receives a side impact as a result of the vehicle being collided from the side thereof, the ECU detects the occurrence of the side collision and transmits a signal to inject gas to an inflator (not shown). Then, the airbag body 42 is inflated by the gas injected from the inflator (not shown) and presses and opens the back pad 20 via the deployment groove 22 inside the seatback 3.

Figure 3:
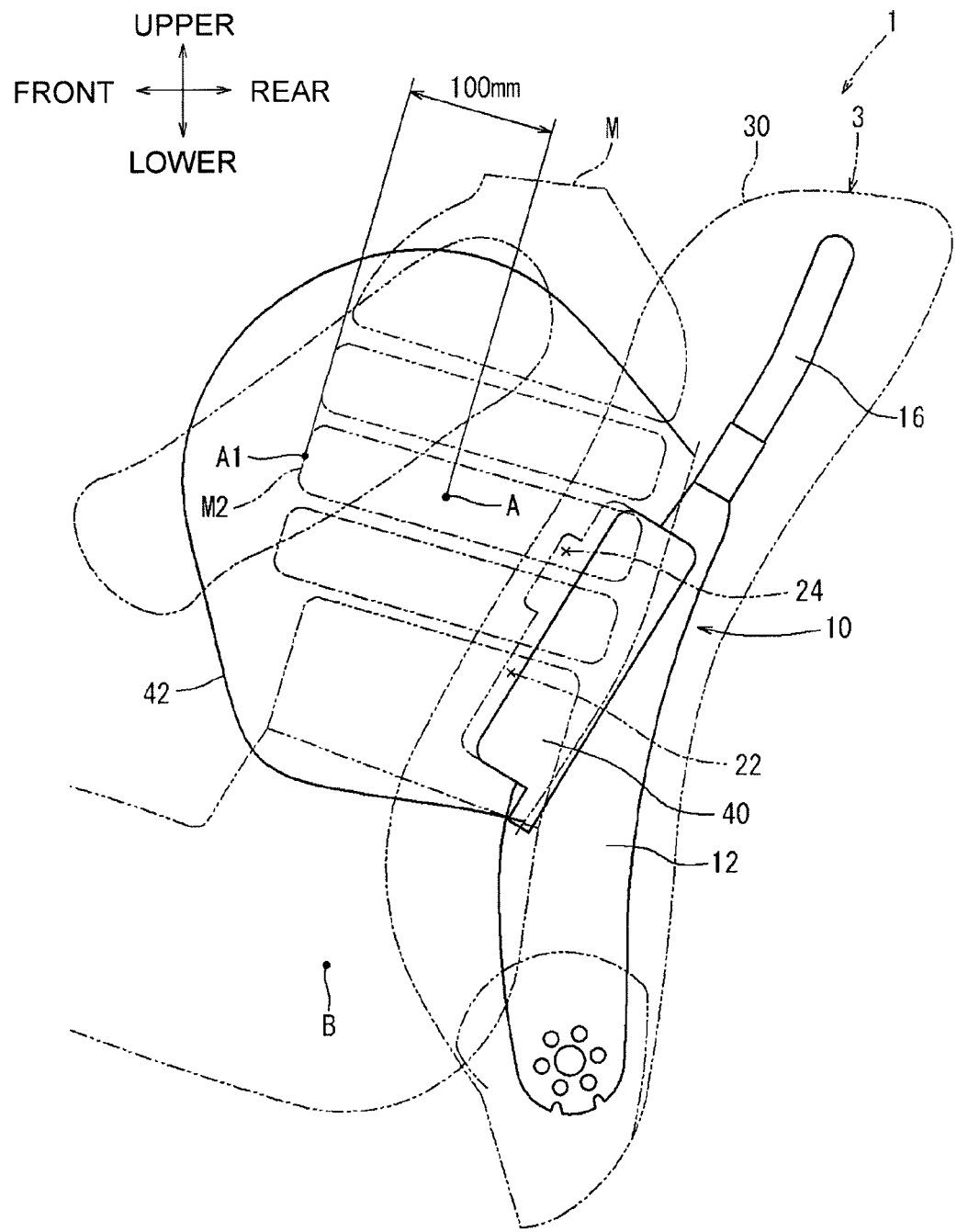
FIG. 3 is a side view which shows a state in which an airbag body shown in FIG. 1 is deployed.

When the airbag body 42 is inflated further with the back pad 20 kept pressed and opened, the inflated airbag body 42 deploys along the trim (not shown) provided to the inside of the side door while tearing the skin 30 which covers the surface of the back pad 20 (refer to FIG. 3). At this time, the airbag body 42 is inflated while being guided into the first guide portion 24 of the deployment groove 22. Therefore, the airbag body 42 deploys so as to pass by the point A, which is the protection reference point, within 10 milliseconds.

The front passenger seat 1 of the first exemplary embodiment of the invention is configured as described above. According to the configuration, the first guide portion 24 which is configured to guide the deployment of the airbag body 42 towards a desired height is formed to the deployment groove 22. Accordingly, for example, the airbag body 42 can deploy so as to pass by the point A, which is the projection reference point, within 10 milliseconds. Namely, the airbag body 42 can reliably deploy to the target deployment position in the height direction of the seatback 3.

Additionally, according to the configuration, the first guide portion 24 is formed by increasing a depth of the deployment groove 22 partially in the height direction. Accordingly, the first guide portion 24 can easily be formed.

Second Exemplary Embodiment

Next, referring to FIGS. 4 to 6, the second exemplary embodiment of the invention will be described. When compared with the front passenger seat 1 of the first exemplary embodiment, a front passenger seat 101 of the second exemplary embodiment differs in that a first guide portion 124 is formed in a different shape from that of the first guide portion 24 of the first exemplary embodiment. Apart from the shape of the first guide portion 124, the configuration of the front passenger seat 101 of the second exemplary embodiment is the same or equivalent to that of the front passenger seat 1 of the first exemplary embodiment, and therefore, same reference numerals are given thereto in the drawings and repetitive description will be omitted.

Figure 4:
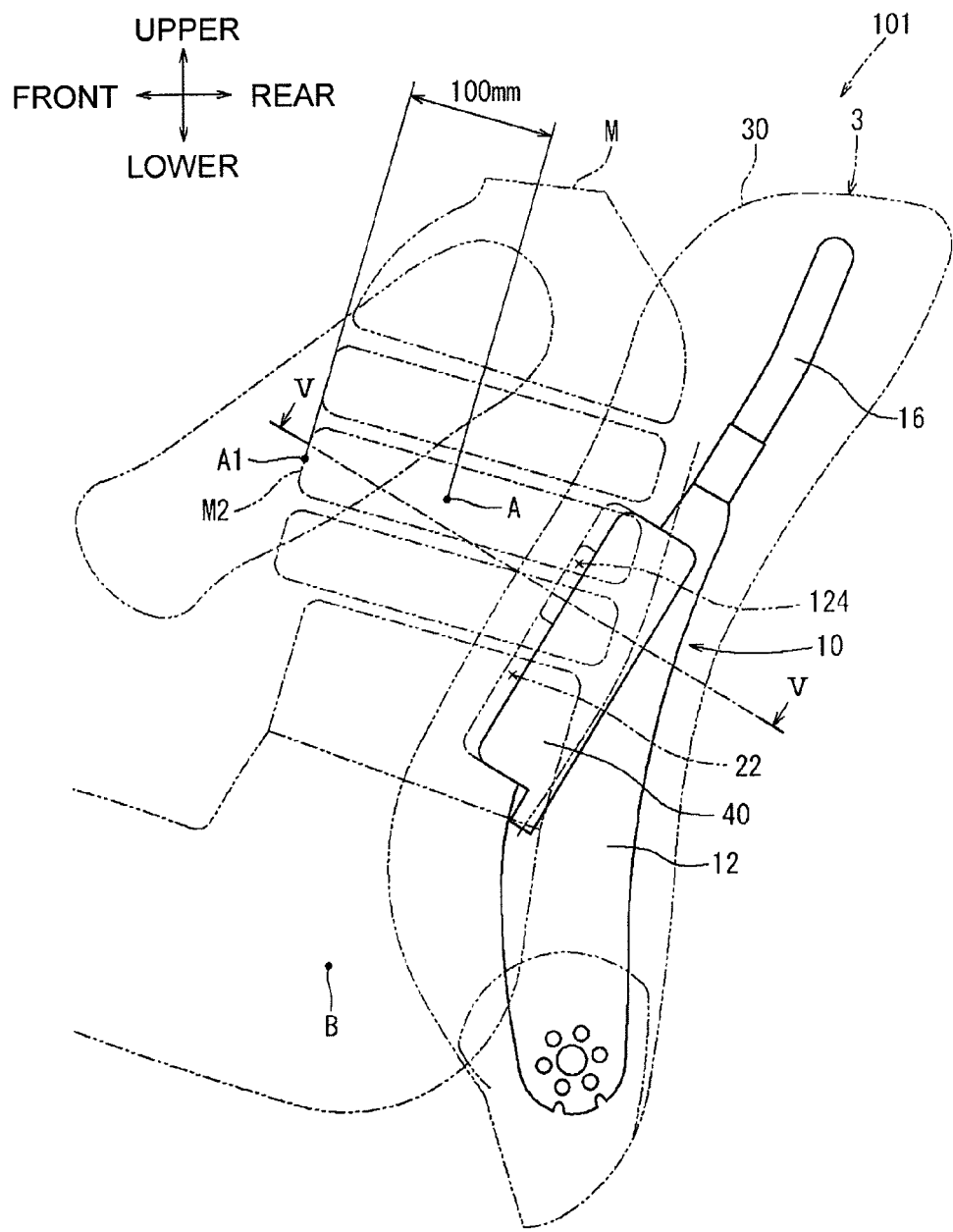
FIG. 4 is a side view of an inside of a front passenger seat according to a second exemplary embodiment of the invention.
Figure 5:
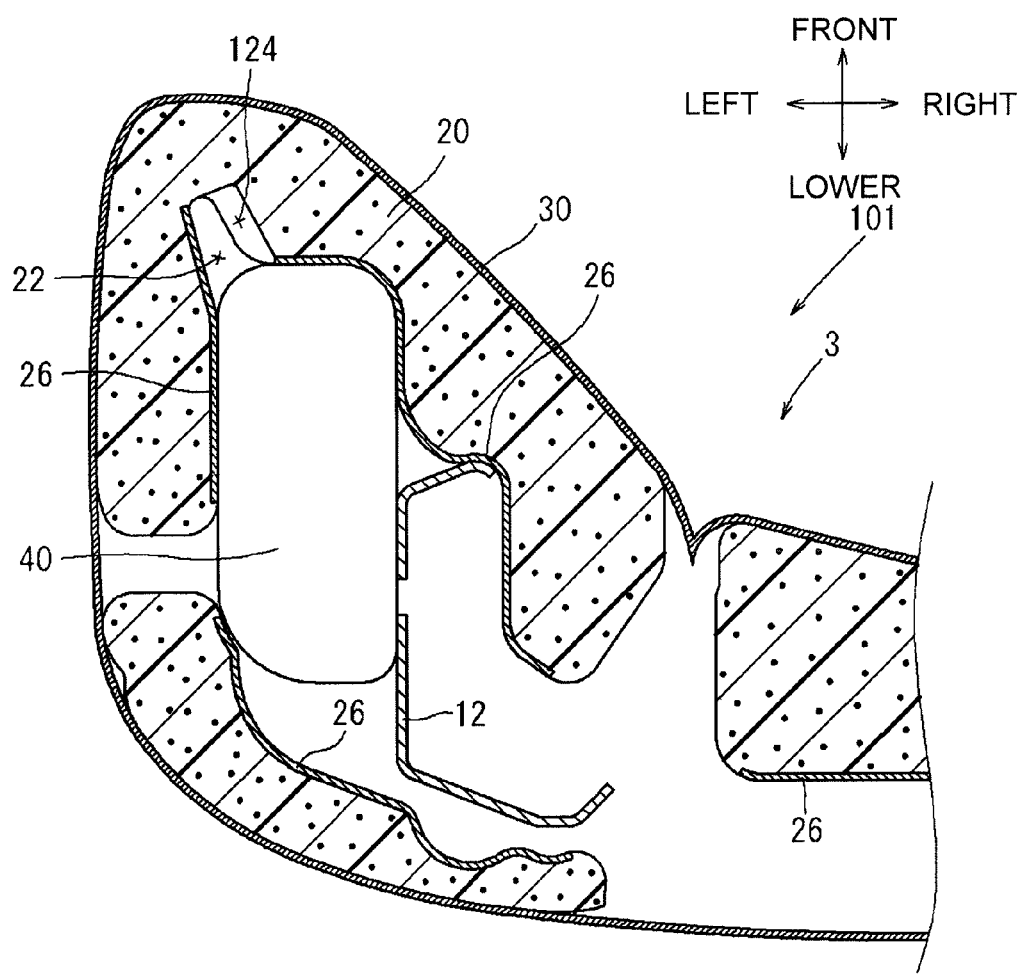
FIG. 5 is a sectional view taken along the line V-V of FIG. 4.

As will be obvious from FIGS. 4 and 5, the first guide portion 124 of the second exemplary embodiment is formed by increasing the width of the deployment groove 22 partially in a height direction thereof. As with the first guide portion 24 of the first exemplary embodiment, the first guide portion 124 of the second exemplary embodiment is also formed so that when the airbag body 42 deploys, the airbag body 42 can pass by a point A within 10 milliseconds.

Figure 6:
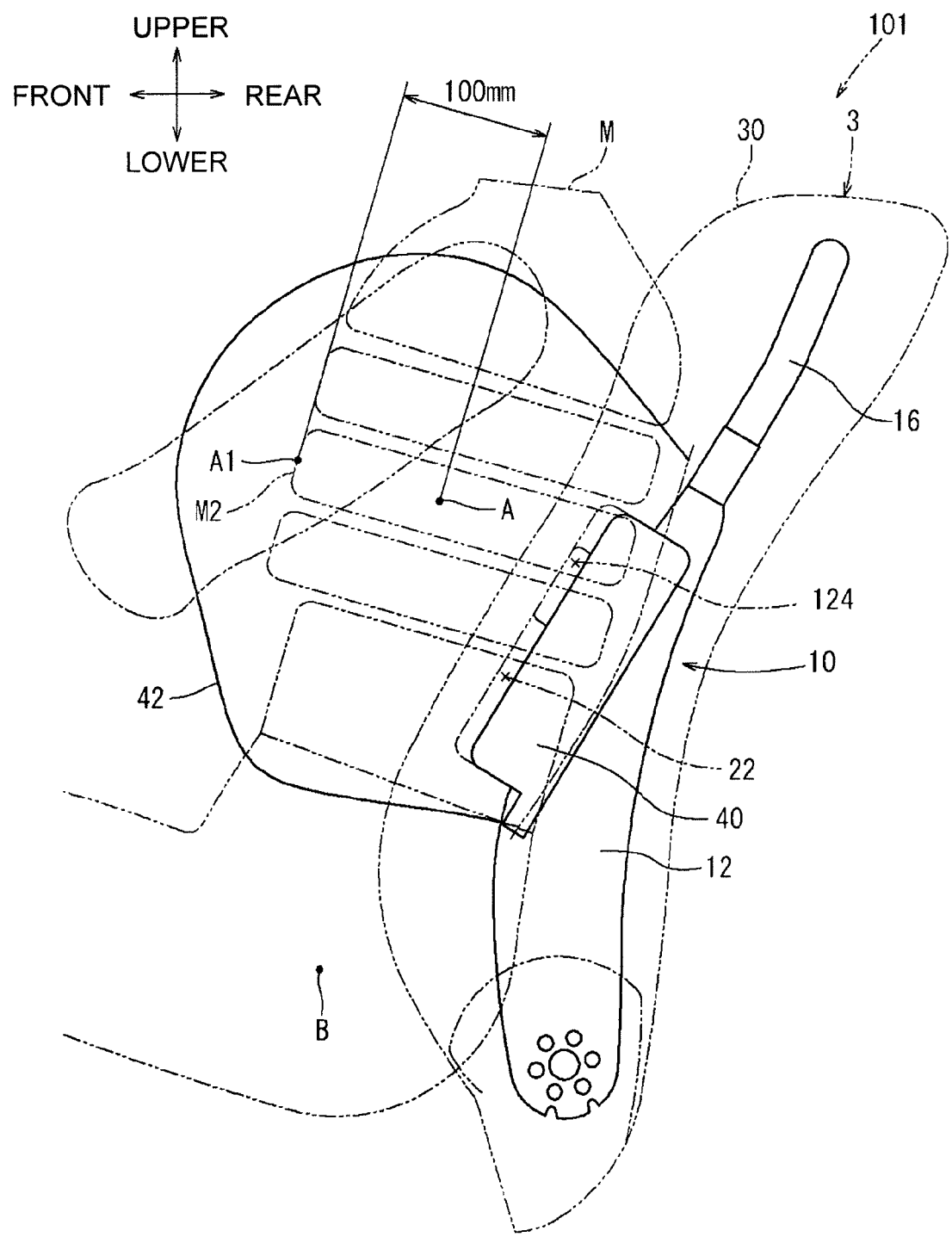
FIG. 6 is a side view to which shows a state in which an airbag body shown in FIG. 4 is deployed.
Figure 7:
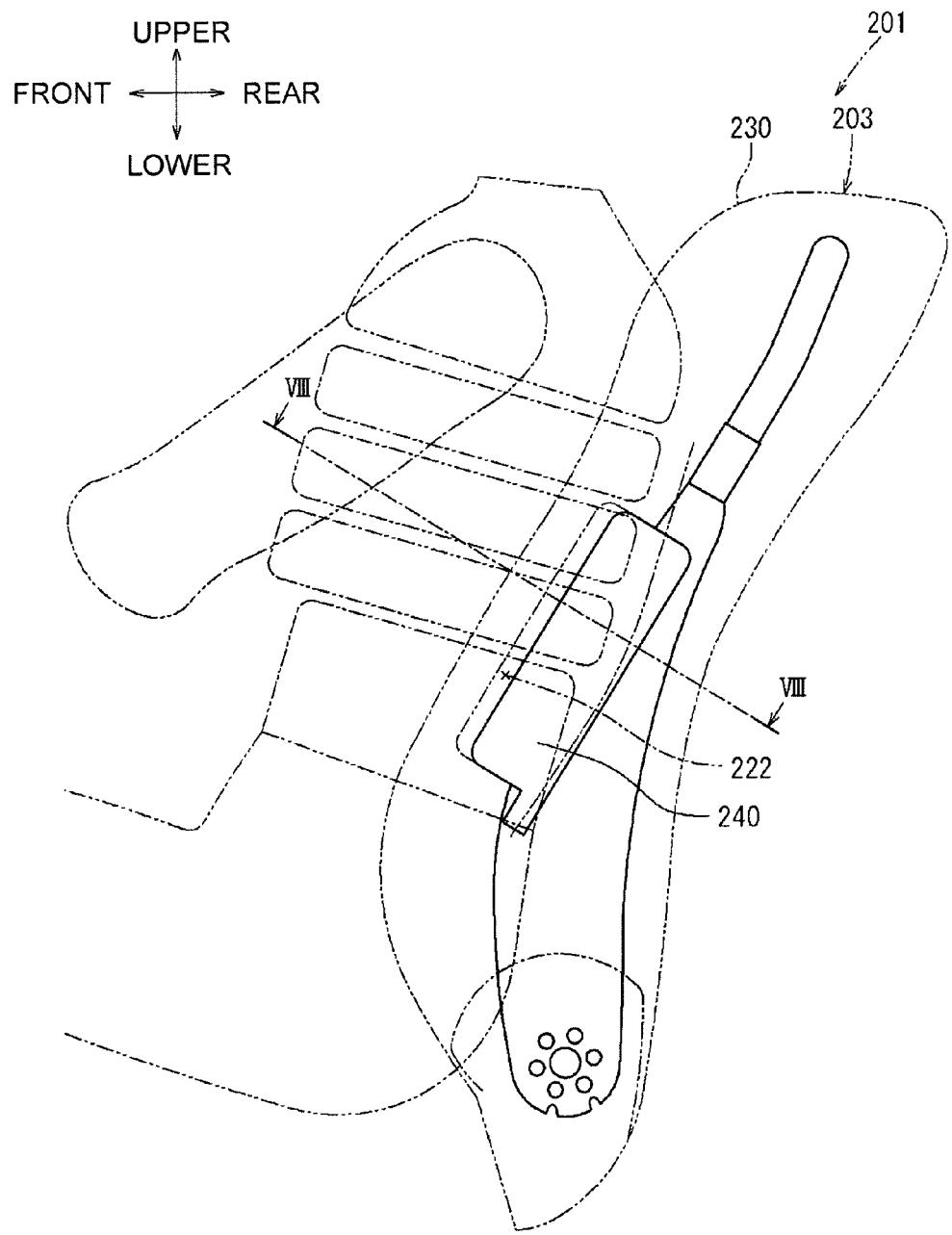
FIG. 7 is a side view of an inside of a front passenger seat according to related art.
Figure 8:
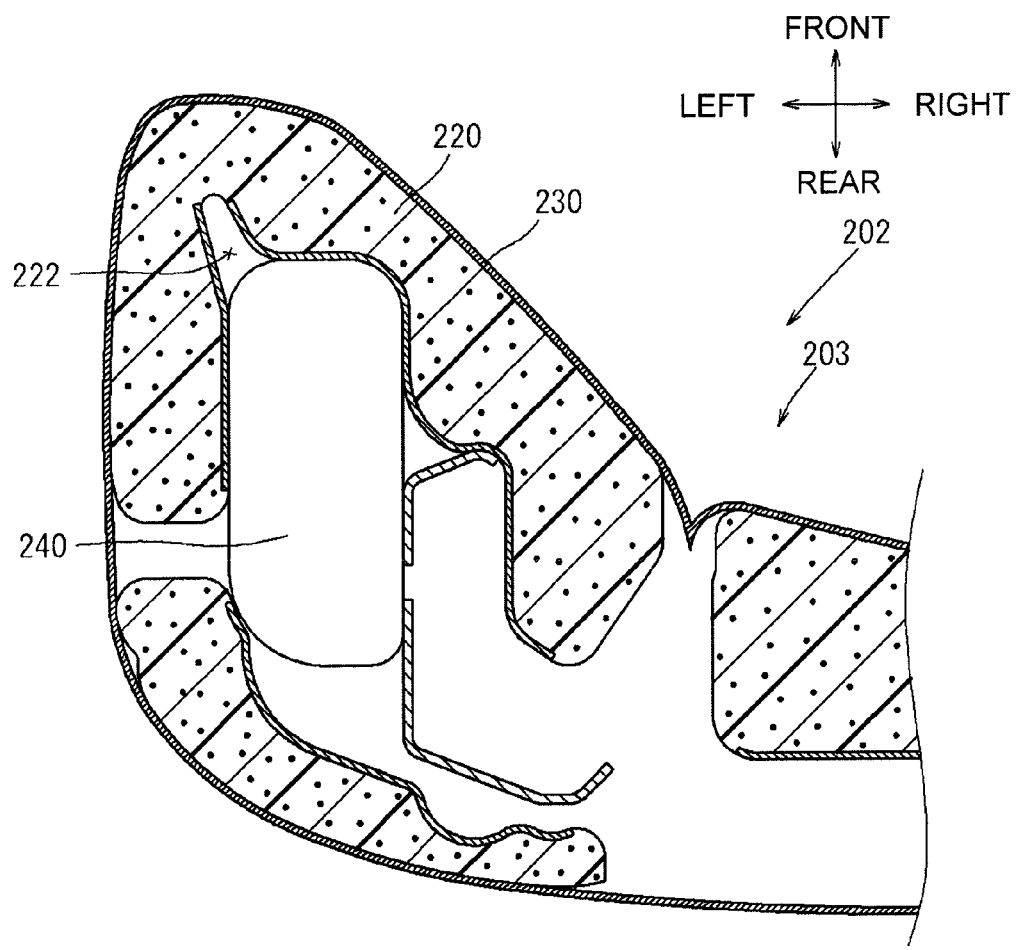
FIG. 8 is a sectional view taken along the line VIII-VIII of FIG. 7.
Figure 9:
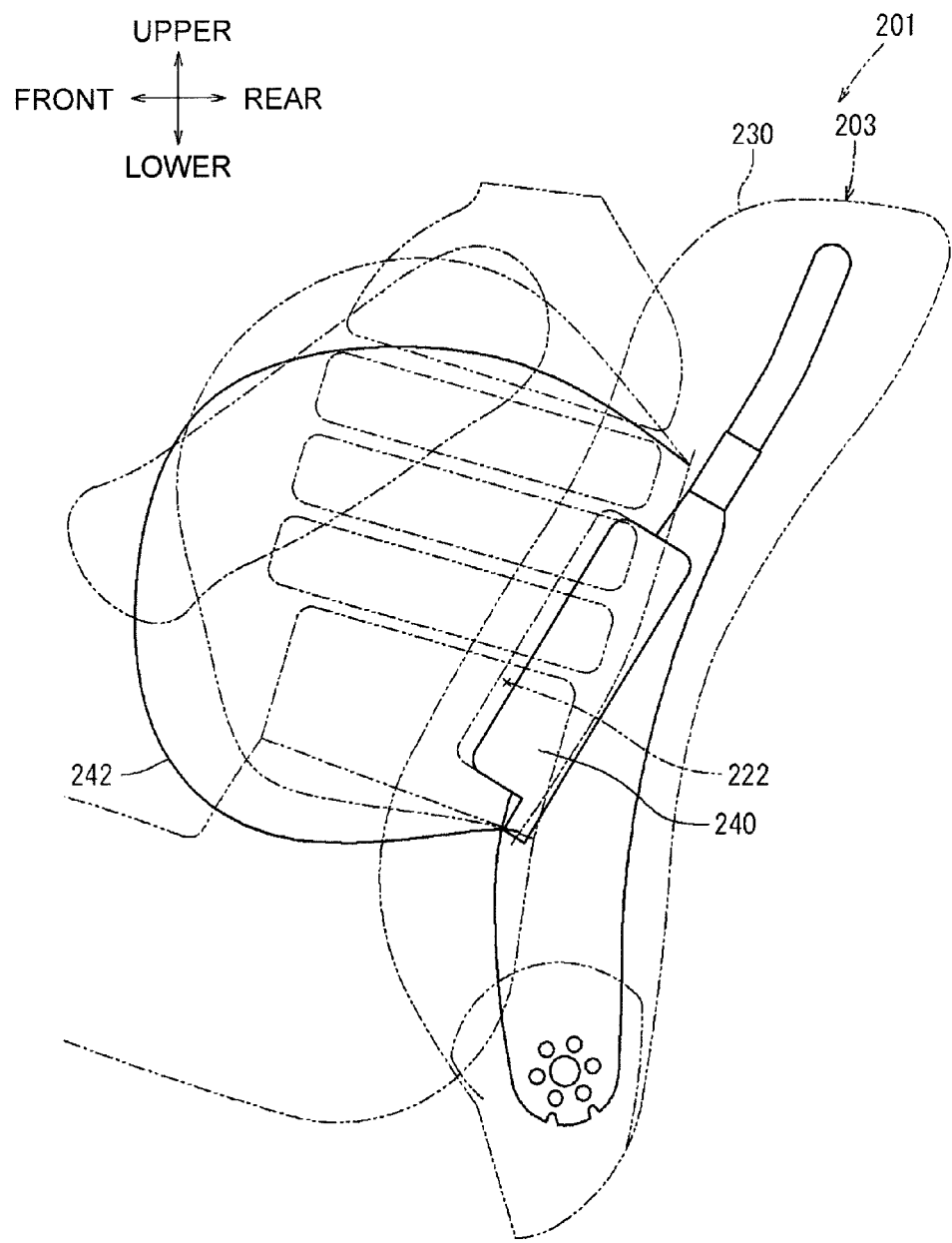
FIG. 9 is a side view which shows a state in which an airbag body shown in FIG. 7 is deployed.

As in the case with the front passenger seat 1 of the first exemplary embodiment, in the front passenger seat 101 of the second exemplary embodiment, when a vehicle is collided from a side thereof, the airbag body 42 deploys along a trim provided to an inside of a side door of the vehicle while tearing the skin 30 which covers a surface of the back pad 20 (refer to FIG. 6). As in the case with the front passenger seat 1 of the first exemplary embodiment, the airbag body 42 is inflated while being guided into the first guide portion 124 of the deployment groove 22. Therefore, the inflated airbag body 42 deploys so as to pass by the point A, which is the protection reference point, within 10 milliseconds.

The front passenger seat 101 according to the second exemplary embodiment is configured as described above. According to this configuration, the same function and advantage as those obtained by the front passenger seat 1 of the first exemplary embodiment can be obtained.

The exemplary embodiments of the invention have been described above. However, the invention is not limited to the above-described exemplary embodiments.

In each exemplary embodiment, the "front passenger seat 1 (101)" is described as an example of a "vehicle seat." However, the invention is not limited thereto, and hence, the invention can also be applied to a "driver seat" or a "rear passenger seat."

Additionally, the chest of the dummy mannequin M is described as being the protection reference point which constitutes the protection target. However, the invention is not limited thereto. The invention can also be applied not only to the protection of the chest of the dummy mannequin M but also to the protection of the hip thereof. In this case, in addition to the point A, a point B (a hip point of the dummy mannequin M) also constitutes a projection reference point. Then, in addition to the first guide portion 24 (124), a second guide portion (not shown) is also formed in the deployment groove 22 so that the airbag body 42 can pass by the point A within 10 milliseconds and the point B within 8 milliseconds. The second guide groove (not shown) is also formed so as to increase the depth of the guide groove 22 partially in the height direction thereof in a similar manner to the manner in which the first guide portion 24 (124) is formed.

Figure 2:
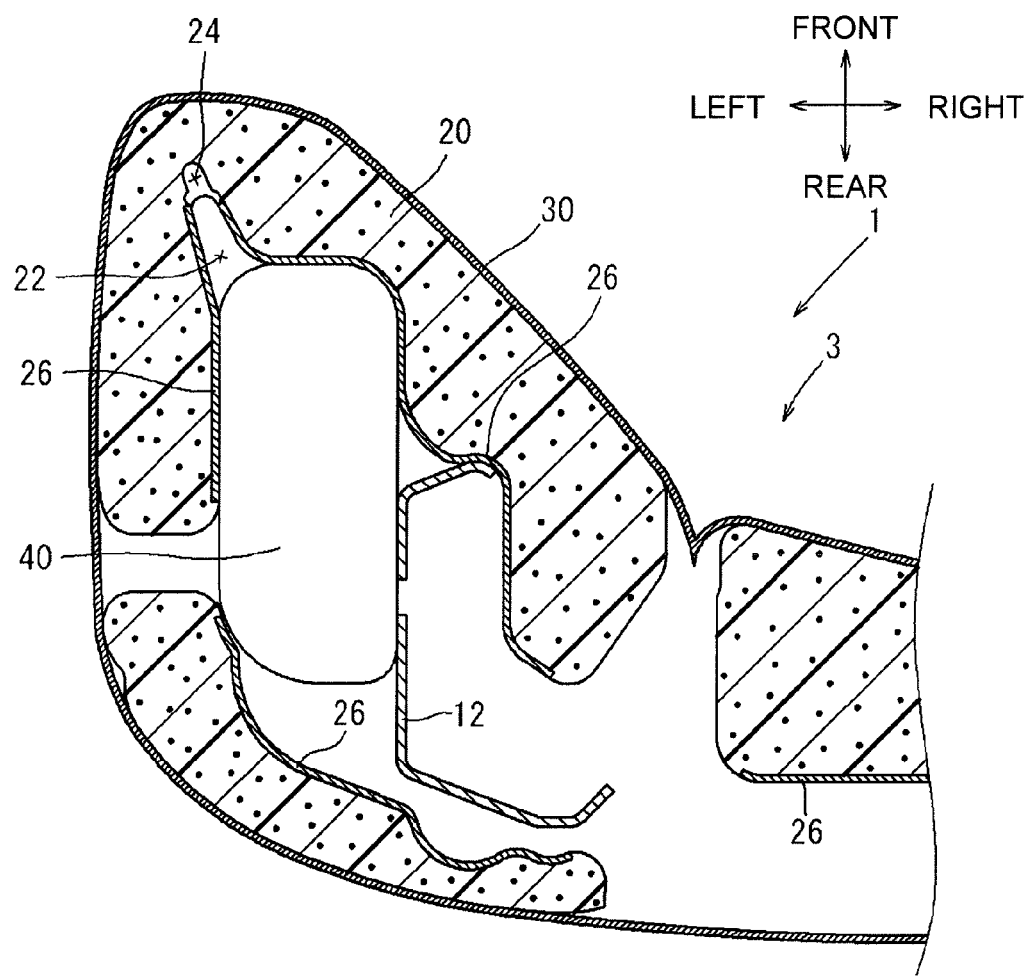
FIG. 2 is a sectional view taken along a line II-II of FIG. 1.

Additionally, in each exemplary embodiment, as will be obvious from FIG. 1, the guide portion 24 (124) is described as not penetrating through the back pad 20 between the inside and outside thereof. However, the invention is not limited thereto, and hence, the first guide portion 24 (124) may penetrate through the back pad 20 between the inside and outside thereof.

Additionally, in each exemplary embodiment, the deployment groove 22 is described as being formed in a shape of a groove. However, the invention is not limited thereto, and hence, the deployment groove 22 may be formed in a shape of a slit.

What is claimed is:

1. A vehicle seat including a side airbag system, the side airbag system comprising:
   an airbag body that is accommodated inside a seatback of the vehicle seat and is configured to deploy during a vehicle side collision; and
   a deployment groove that is configured to control the deployment of the airbag body and is provided in a cushion pad of the seatback,
   wherein a guide portion, configured to guide the deployment of the airbag body towards a desired height, is provided on the deployment groove and partially increases a depth of the deployment groove in a height direction of the deployment groove.

2. A vehicle seat including a side airbag system, the vehicle seat comprising:
   a seatback including a cushion pad;
   an airbag body that is accommodated inside the seatback and is configured to deploy during a vehicle side collision;
   a deployment groove that is provided in the cushion pad and is configured to control the deployment of the airbag body; and
   a guide portion that is provided on the deployment groove and is configured so as to partially increase a width of the deployment groove in a height direction of the deployment groove to guide the deployment of the airbag body towards a desired height.

3. A vehicle seat including a side airbag system, the side airbag system comprising:
   an airbag body that is accommodated inside a seatback of the vehicle seat and is configured to deploy during a vehicle side collision; and
   a deployment groove that is configured to control the deployment of the airbag body and is provided in a cushion pad of the seatback,
   wherein a guide portion, configured to guide the deployment of the airbag body towards a desired height, is provided on the deployment groove and partially increases a width of the deployment groove in a height direction of the deployment groove.

* * * * *